United States Patent [19]
Martin et al.

[11] Patent Number: 5,484,333
[45] Date of Patent: Jan. 16, 1996

[54] LOADER FOR BREAST PROCESSOR

[75] Inventors: Eugene G. Martin, Denver; Scott Cook, Strasburg, both of Pa.

[73] Assignee: Foodcraft Equipment Company, Lancaster, Pa.

[21] Appl. No.: 309,876

[22] Filed: Sep. 21, 1994

Related U.S. Application Data

[63] Continuation-in-part of Ser. No. 98,007, Jul. 29, 1993, Pat. No. 5,374,214.

[51] Int. Cl.⁶ .................................................. A22C 21/00
[52] U.S. Cl. ........................... 452/182; 452/165; 452/167
[58] Field of Search ........................................ 452/182, 167, 452/165, 166, 160, 177, 183

[56] References Cited

U.S. PATENT DOCUMENTS

| | | | |
|---|---|---|---|
| 4,896,399 | 1/1990 | Hazenbroek | 452/167 |
| 5,035,673 | 7/1991 | Hazenbroek | 452/167 |
| 5,154,665 | 10/1992 | Hazenbroek | 452/167 |
| 5,184,974 | 2/1993 | Cornelissen et al. | 452/160 |
| 5,194,035 | 3/1993 | Dillard | 452/160 |
| 5,374,214 | 12/1994 | Martin | 452/165 |

*Primary Examiner*—Willis Little
*Attorney, Agent, or Firm*—Shoemaker and Mattare, Ltd.

[57] ABSTRACT

Poultry carcasses, having open abdominal cavities, are suspended from a foot shackle conveyor. As each carcass approaches a knife for severing the upper and lower portions of the carcass, the top portion is transferred onto an approaching tine which enters the cavity, dipping downward as it does so. After the carcass is halved, the lower portion remains suspended in the foot shackle conveyor, and the top portion is carried away by the tine for further processing.

7 Claims, 10 Drawing Sheets

LOADER FOR BREAST PROCESSOR

This application is a continuation-in-part of copending application No. 08/098,007 now U.S. Pat. No. 5,374,214.

BACKGROUND OF THE INVENTION

This invention relates generally to butchering equipment, and more particularly to a breast processor for poultry.

Butchering chicken is becoming increasingly automated. A number of inventors have tackled the difficult task of automatically butchering the "upper half" of a chicken carcass, i.e., the back, breasts and wings. However, owing in part to the fact that chickens are not exactly uniform workpieces, either in size or proportion, this task has continued to require human intervention at certain critical points, to avoid unsatisfactory cutting that would reduce yields and/or produce an inferior product. It is desired to minimize the need for human intervention, both to protect workers from cutting blades and to improve butchering efficiency.

The invention described in the application mentioned above automatically transferred each bird carcass from a tongue or tine protruding from a disk to a special fixture that supported the carcass as it was carried past a series of rotating knives, which could be positioned as desired to achieve a variety of cutting schemes. How the carcass was placed on the tines was not addressed in that disclosure. This application illustrates the subject matter previously described (with a few minor modifications), but is more concerned with the upstream aspects of the apparatus, that provide automatic transfer from a conventional foot shackle conveyor to the tines.

SUMMARY OF THE INVENTION

An object of the invention is to transfer, automatically, bird carcasses from a foot shackle conveyor to a tined disk, and ultimately to a fixture for supporting the carcass as it is cut up, without requiring intensive labor.

Another object is to achieve a low rate of unsuccessful transfers.

A further object is to minimize product damage as a result of automatic handling.

With the present invention, poultry carcasses, having open abdominal cavities, are suspended from a foot shackle conveyor. As each carcass approaches a knife for severing the upper and lower portions of the carcass, the top portion is transferred onto a laterally moving tine which enters the cavity, dipping downward as it does so. After the carcass is halved, the lower portion remains suspended in the foot shackle conveyor, and the top portion is carried away by the tine for further processing.

BRIEF DESCRIPTION OF THE DRAWINGS

In the accompanying drawings.

DESCRIPTION OF THE PREFERRED EMBODIMENT

The invention is embodied in a butchering apparatus comprising, generally, a cutting machine and an automatic loader for receiving the upper half (breast, back and wings) of each bird on a foot shackle conveyor and then feeding those portions to the cutting machine in a predictable orientation.

Figure 2:
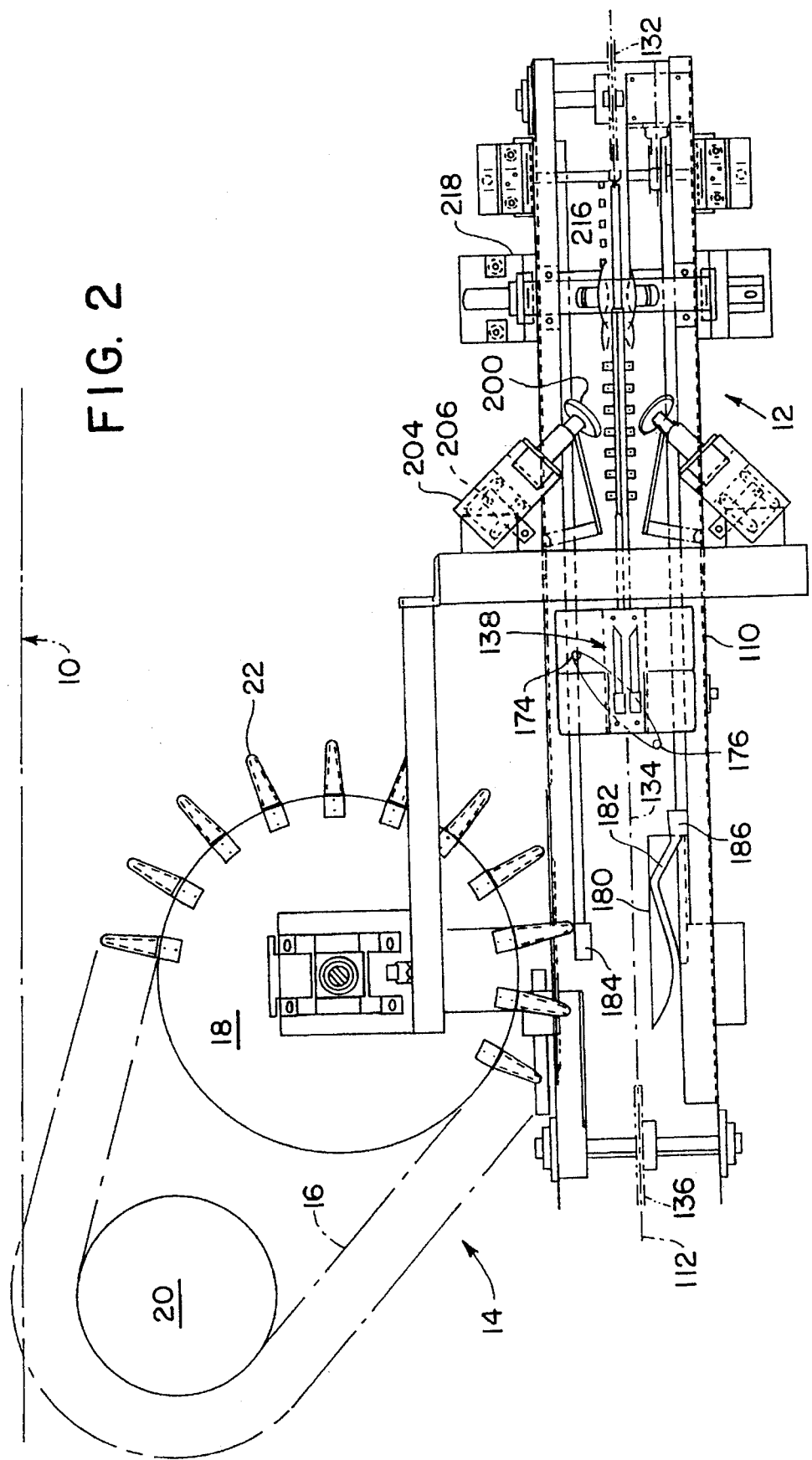
FIG. 2 is a top plan view thereof.

In the plan view of FIG. 2, the shackle conveyor plane is represented generally by the numeral 10. The cutting machine is item 12, and the automatic loader is designated 14.

Description of Loader

The loader comprises a pear-shaped loop of roller chain 16 running on a large driven sprocket 18 and a smaller, toothless wheel 20. Attached to the chain plates are a series of round-tipped tapered tines 22, which are inserted into the chest cavity of the birds just before the upper and lower halves are severed, and then carry the upper half to the cutting machine.

Figure 7:
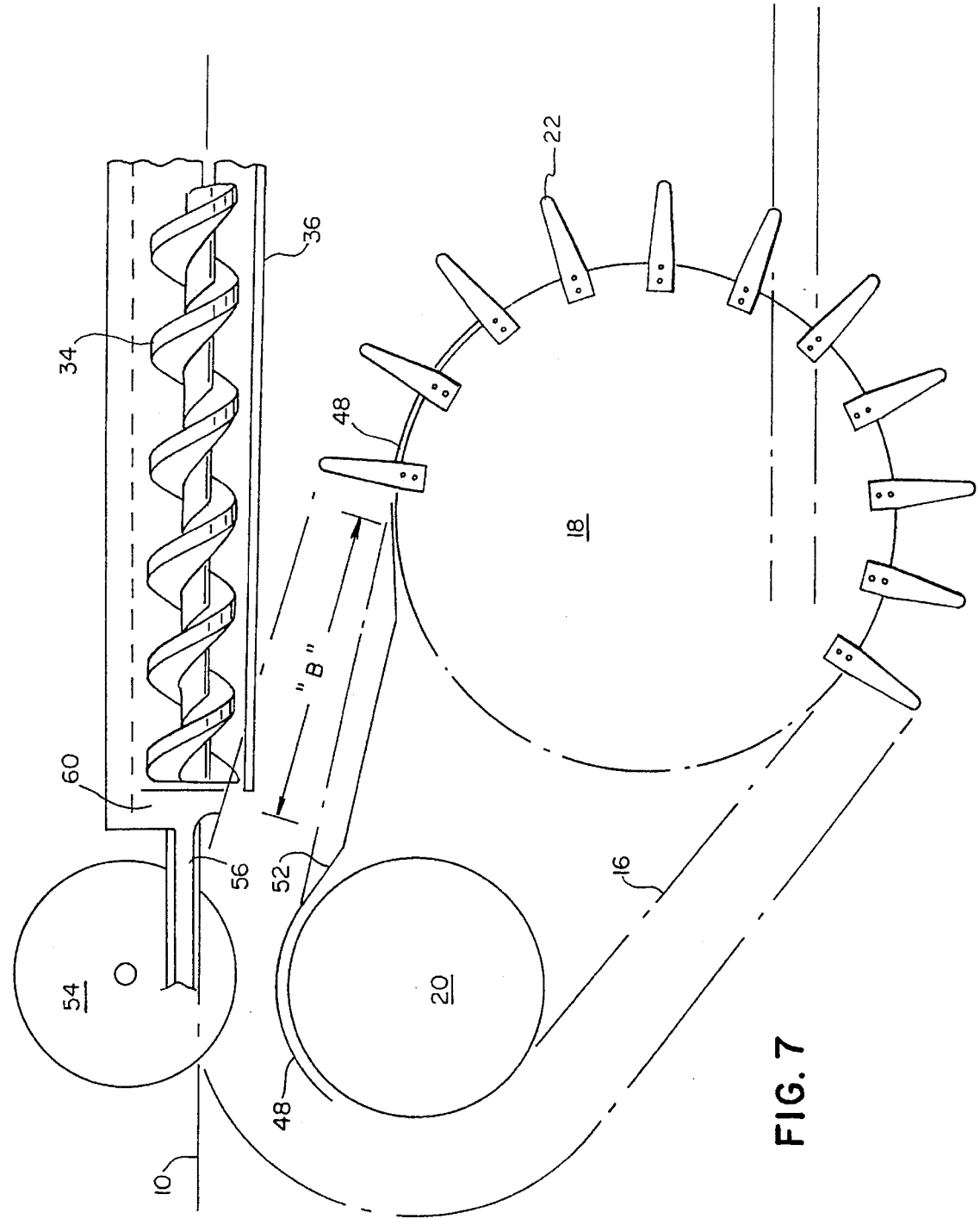
FIG. 7 is a top plan view of an automatic apparatus for transferring bird carcasses from a foot shackle conveyor line, shown on the left, to a breast cutting machine, shown diagrammatically on the right.

As one may see in FIG. 7, the wheel 20 passes near the foot shackle line. Transfer of the birds upper halves from that conveyor to the tines occurs at the point of greatest proximity. Likewise, the large sprocket 18 has a point nearest the cutting machine, and birds are moved from the tines to special fixtures, described below, at that point.

Prior to their arrival at the scene depicted in FIG. 2, the birds, having been loaded into the shackle conveyor with their breasts all facing the same way, were passed over a knife which cut through across the abdomen almost to the backbone, so that the weight of the top half of the bird is now supported only by the back. The entrails had already been removed. The abdominal openings now face the tines.

A major difficulty addressed by this invention is in getting each tine reliably positioned within a bird's chest cavity, without spearing or otherwise injuring the product.

having found it impossible to get good results with tines held horizontal at all times, we discovered much better results are achieved by dipping the tines downward about 30° from horizontal as they approach the cavity and enter it. Once the back is severed, the tine supporting the upper half must be raised again to horizontal, so that the product will not fall off.

Figure 8:
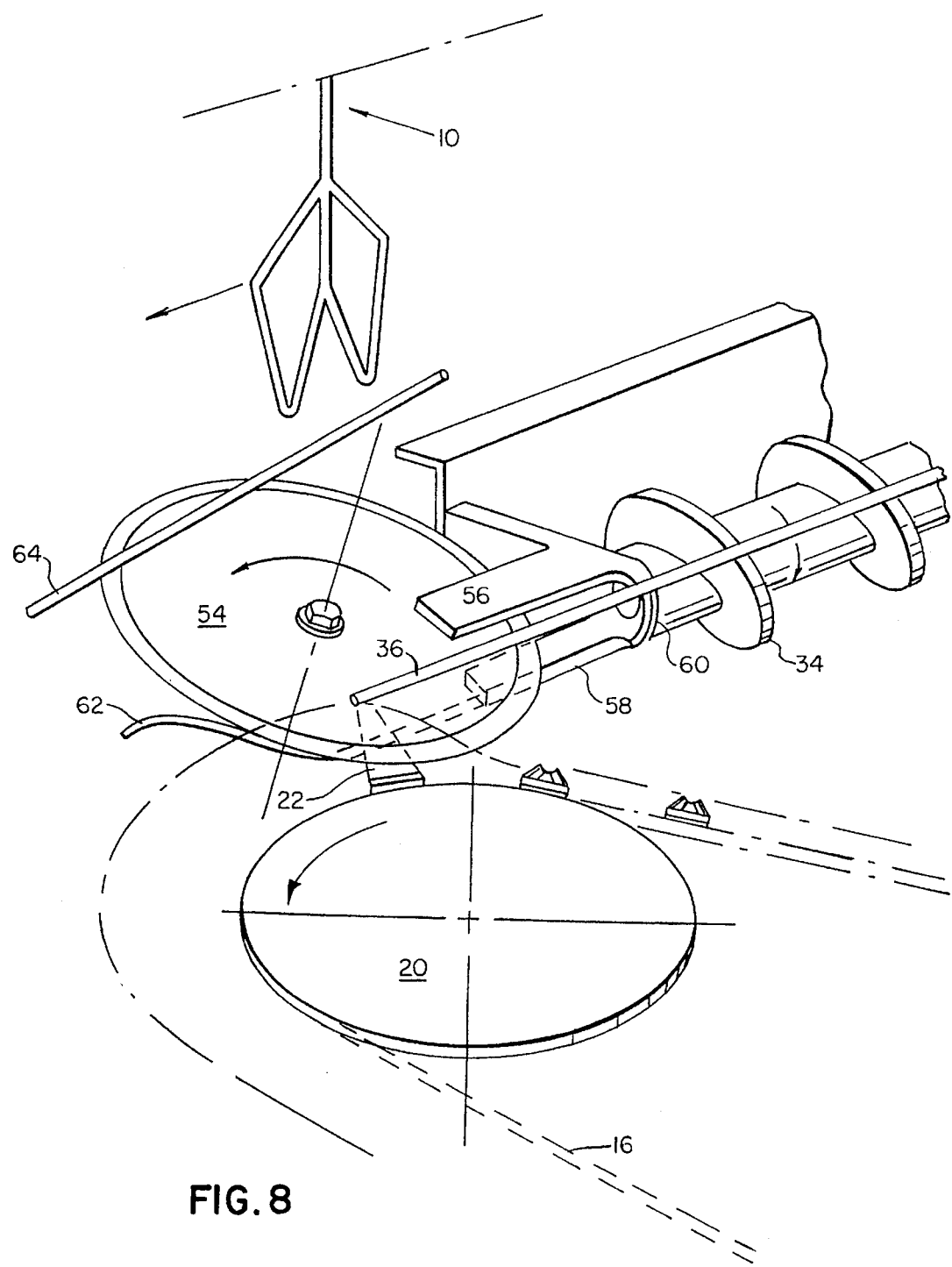
FIG. 8 is an isometric view, showing a portion of the transfer device.
Figure 10:
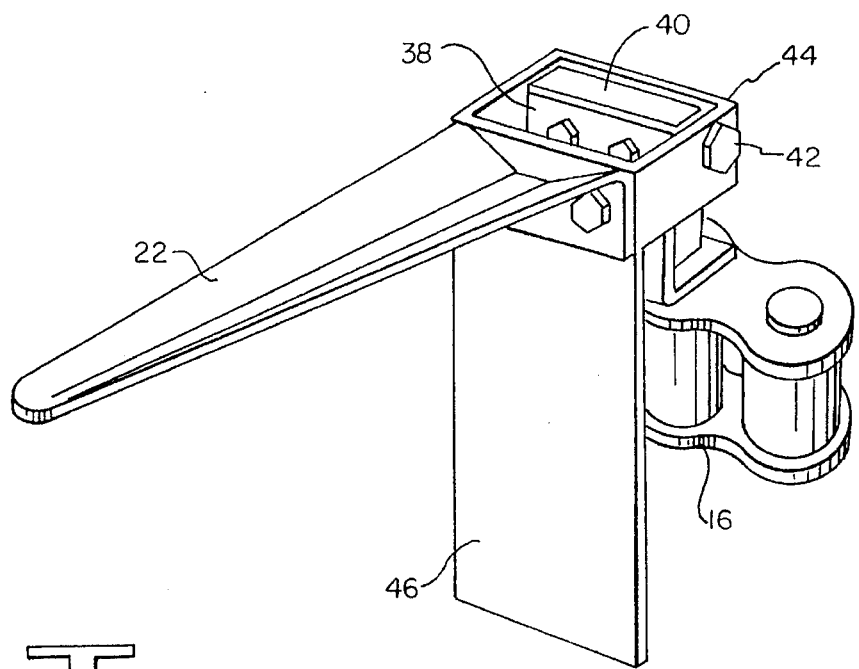
FIG. 10 is a detailed view of one of the tines.
Figure 9:
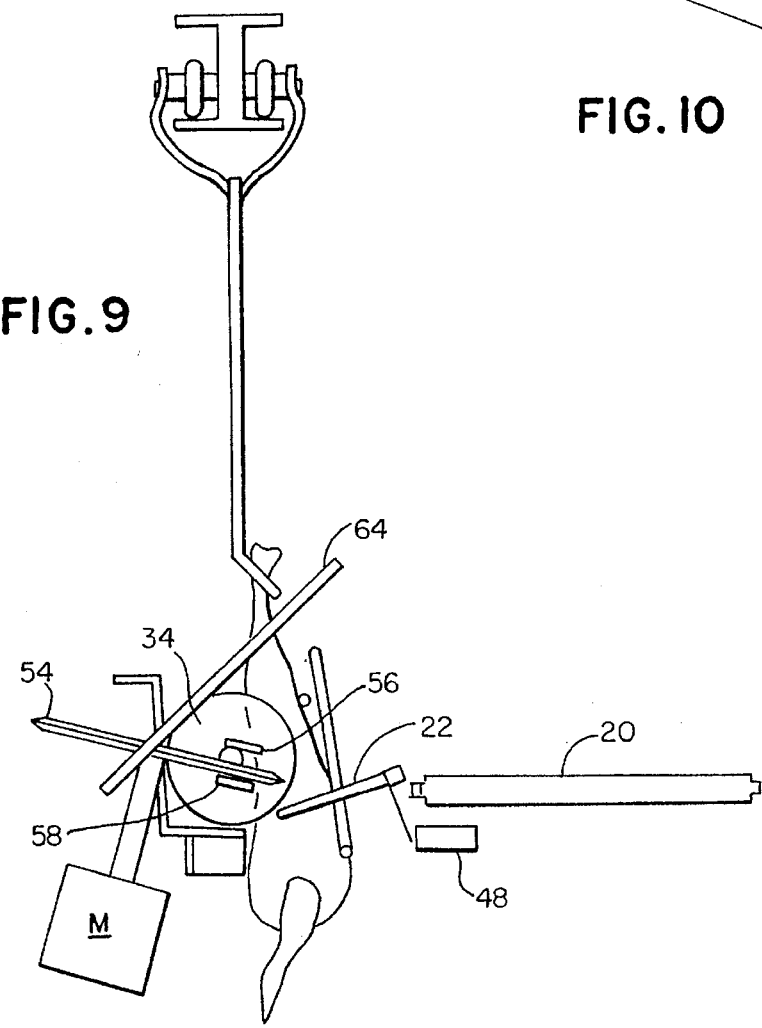
FIG. 9 is a sectional view looking up the foot shackle line, that is, with the birds approaching the viewer, taken on the plane 9—9 in FIG. 7.
Figure 11:
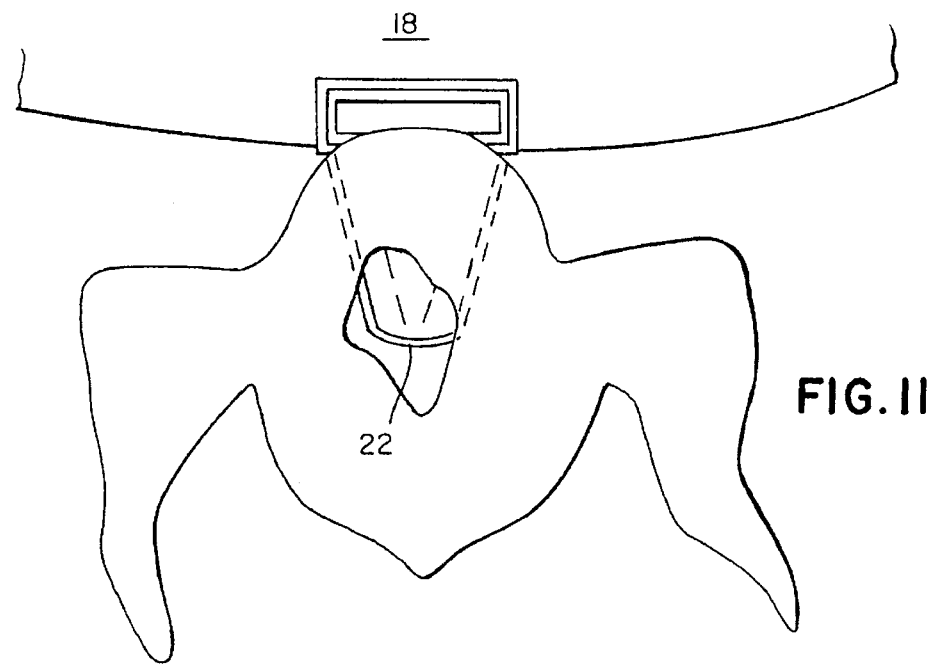
FIG. 11 shows tine entering the chest cavity of a bird, suspended from a foot shackle.
Figure 12:
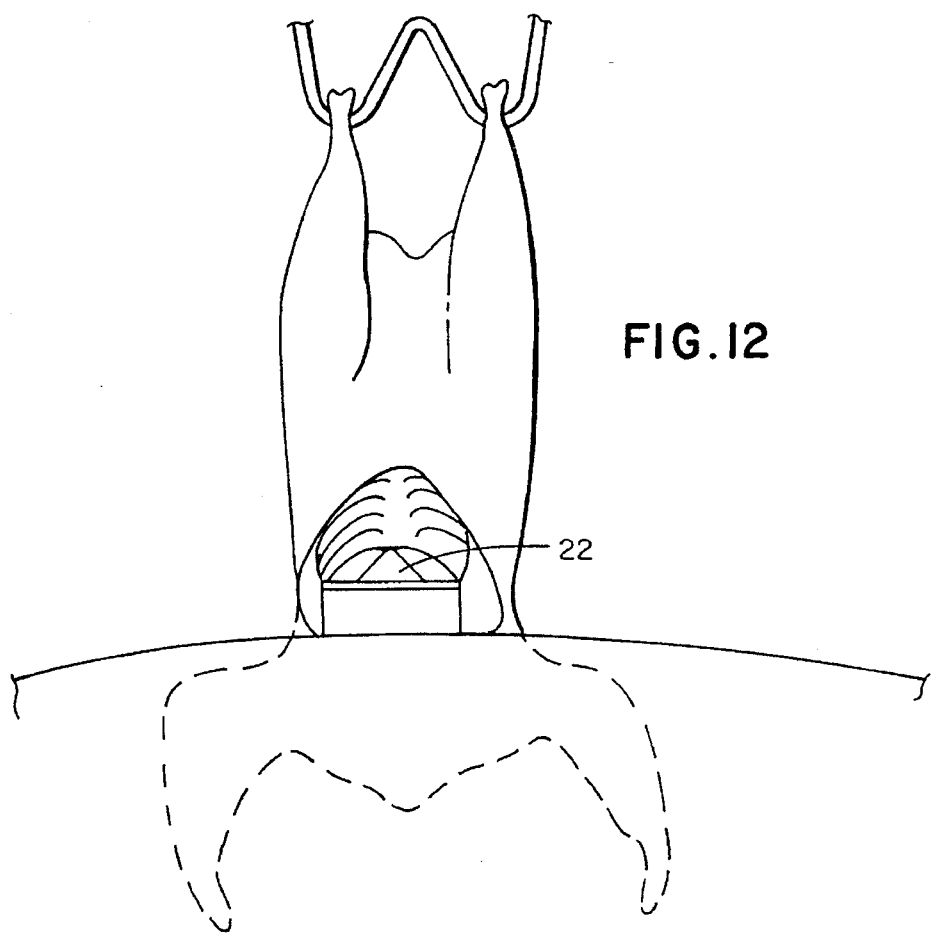
FIG. 12 shows the tine from the opposite direction, after the top half of the bird has been transferred onto it.

By making the tines pivotable about a horizontal axis, and by including means for varying the dip angle of each tine, we have greatly improved automatic loading of the birds onto the tines. The features of the invention to the left of FIG. 7 are critical to achieving successful transfers. FIGS. 9–10 show portions of the apparatus in greater detail, while FIG. 8 provides a good view of this important area, including a portion of the rotating auger 34 which controls the position of each bird, moving it at the same speed at the shackle above, and preventing the bird from swinging. The helical flutes of the auger are spaced sufficiently to receive between them the back of a bird.

As birds approach the auger, they are restrained on the right (FIG. 9), that is, the breast side, by a guide rod 36 running parallel to the vertical plane of the shackle conveyor. As it encounters the auger, each bird is trapped in a groove of the auger by the guide rod. The abdominal opening is exposed, beneath the guide rod, generally at the level of the tine carrier chain.

FIG. 10 shows in detail the tine mounting. The carrier chain has vertically extending tabs 38, at intervals corresponding to the shackle interval. A small block 40 is bolted to each tab, and the block has a horizontal through hole which receives a bolt 42 serving as a hinge pin. The bolt passes, at either end, through holes in a rectangular tine support 44, the outboard side of which has an integral long tab 46, which acts as a cam follower. A tine 22 is bolted to each tine support, above the long tab. The tab and tine are about perpendicular, and normally, the tine is horizontal, and the tab vertical. This "normal" position is maintained, around most of the loop, by a stationary UHMW cam plate 48 whose peripheral edge extends outward sufficiently to maintain the position illustrated by solid lines in FIG. 10. However, as the tines approach the foot shackles, in the zone "B" shown in FIG. 7, the cam plate is cut away, to allow the tines to drop about 30°, as represented by broken lines in FIG. 10. This cut away is located so that the tines begin to drop just as they enter the abdominal cavities, and continue to do so as the tine comes nearer to the bird. In this way, each tine enters a bird at the proper angle to become fully seated without damaging the product, and with few incidents of failure to seat.

After the tine is fully inserted into the cavity, the long tab encounters a ramp 52 at the end of the cam plate cut away. The ramp raises the tine to horizontal, again, while the lower and upper halves of the bird are completely severed by a rotary blade 54, depicted in FIGS. 7 and 9, passing just over the tines. The direction of rotation is indicated in the latter figure. To keep the bird from following the blade, there are a pair of rectangular bars 56, 58, one above and one below the blade. Both are welded to a bearing support 60 for the downstream end of the auger, and the lower bar has welded to its free end a quarter-inch diameter rod 62 that extends underneath and beyond the blade and tines. This rod continues along a path just below the tine tips, as their path diverges from that of the shackle conveyor, to keep the now-severed upper half of each bird in place.

In FIGS. 7 and 9, one can see a straight rod 64 extending obliquely above the rotary blade. This rod pulls the lower half of the bird away from the upper half after the cut is made, just in case the parts were incompletely severed. Afterwards, the lower halves remain with the shackles, and are subjected to further processing, not shown. The upper halves are carried around the loop by the tines, until they are transferred to the special fixtures mentioned above.

Description of Cutting Machine

Figure 1:
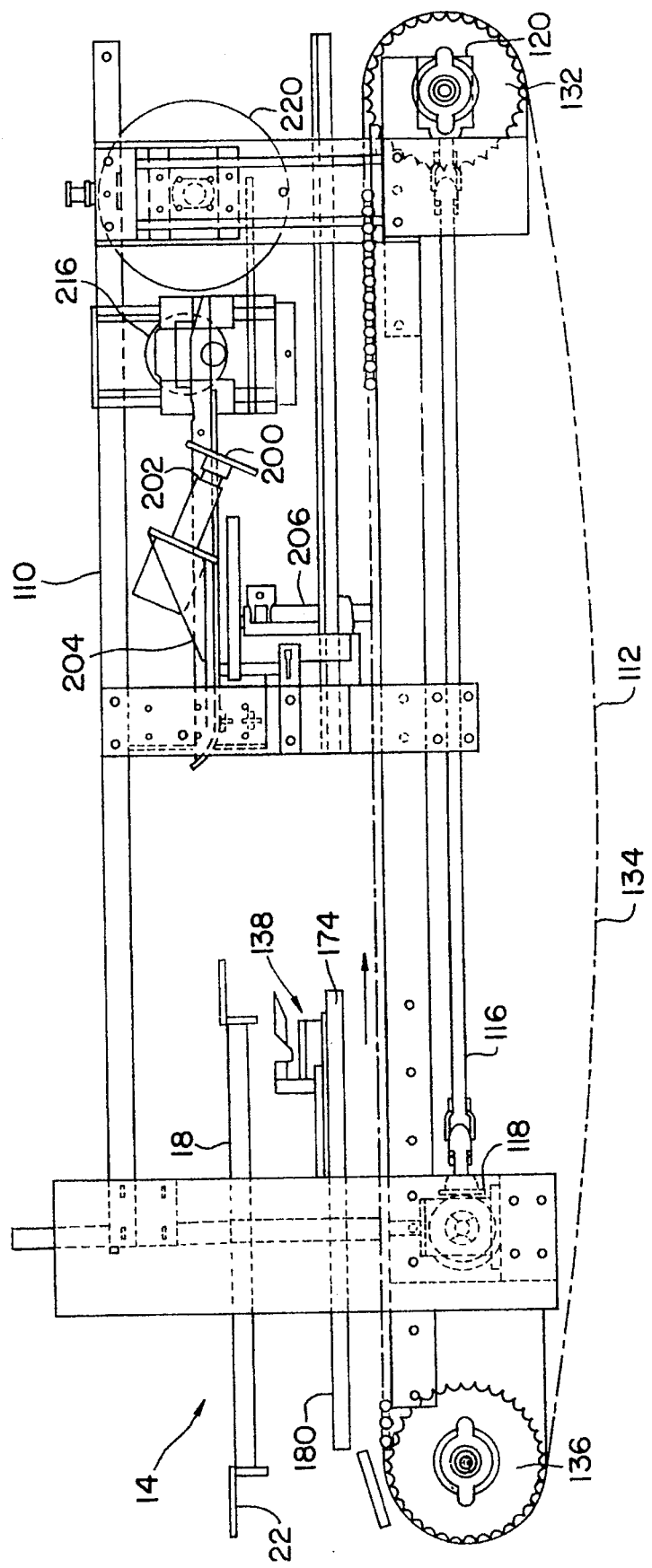
FIG. 1 is a diagrammatic side elevation of a breast processor embodying the invention.

The cutting device includes a frame, designated generally by numeral 110 in FIG. 1, which supports an endless conveyor 112 whose upper run moves in a "downstream" direction indicated by an arrow. The conveyor receives poultry carcasses from the loader 14, appearing to the left in FIG. 1, and moves them through a series of cutting implements appearing to the right.

Figure 3:
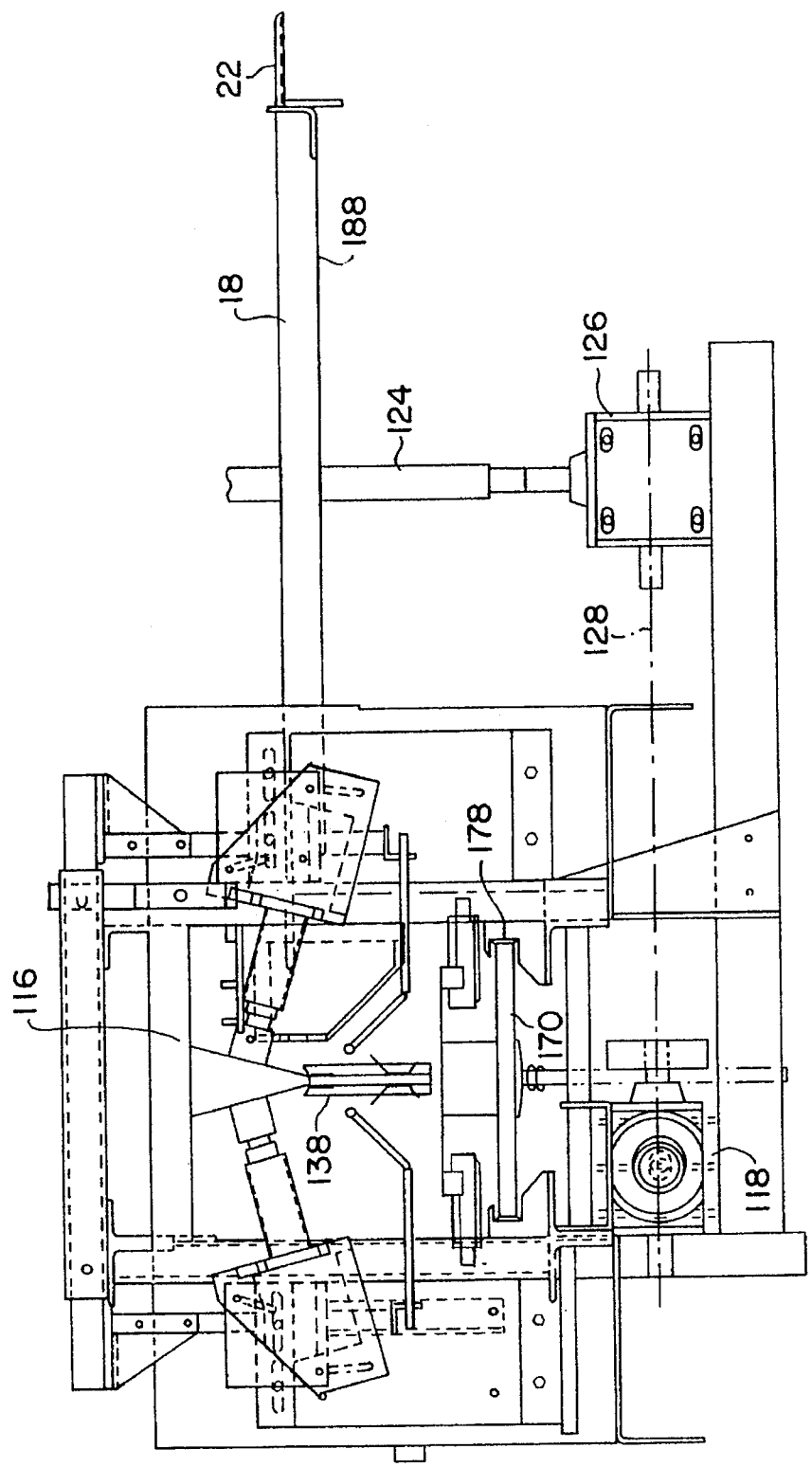
FIG. 3 is an end view thereof, seen from the downstream end of the apparatus.

The conveyor is driven, via a drive shaft 116 and right-angle transfer units 118, 120 from a source of power, which may be either a motor, or preferably, a power take-off unit driven by the chain of a foot shackle conveyor (not shown) that carries birds through the processing plant. The power unit 122 seen at the top of FIG. 3 is therefore illustrated diagrammatically. Items 124, 126 and 128 are, respectively, a vertical drive shaft, a right-angle transfer unit, and a horizontal drive shaft connecting unit 126 to unit 118.

Unit 120 drives a downstream sprocket 132. The conveyor chain 134 runs in an endless loop around this and an upstream idler sprocket 136, carrying a series of fixtures 138 through the cutting stations. The fixtures are affixed to the chain at about one foot intervals, but for clarity, only one such fixture is shown in each of FIGS. 1, 2 and 3.

Figure 4:
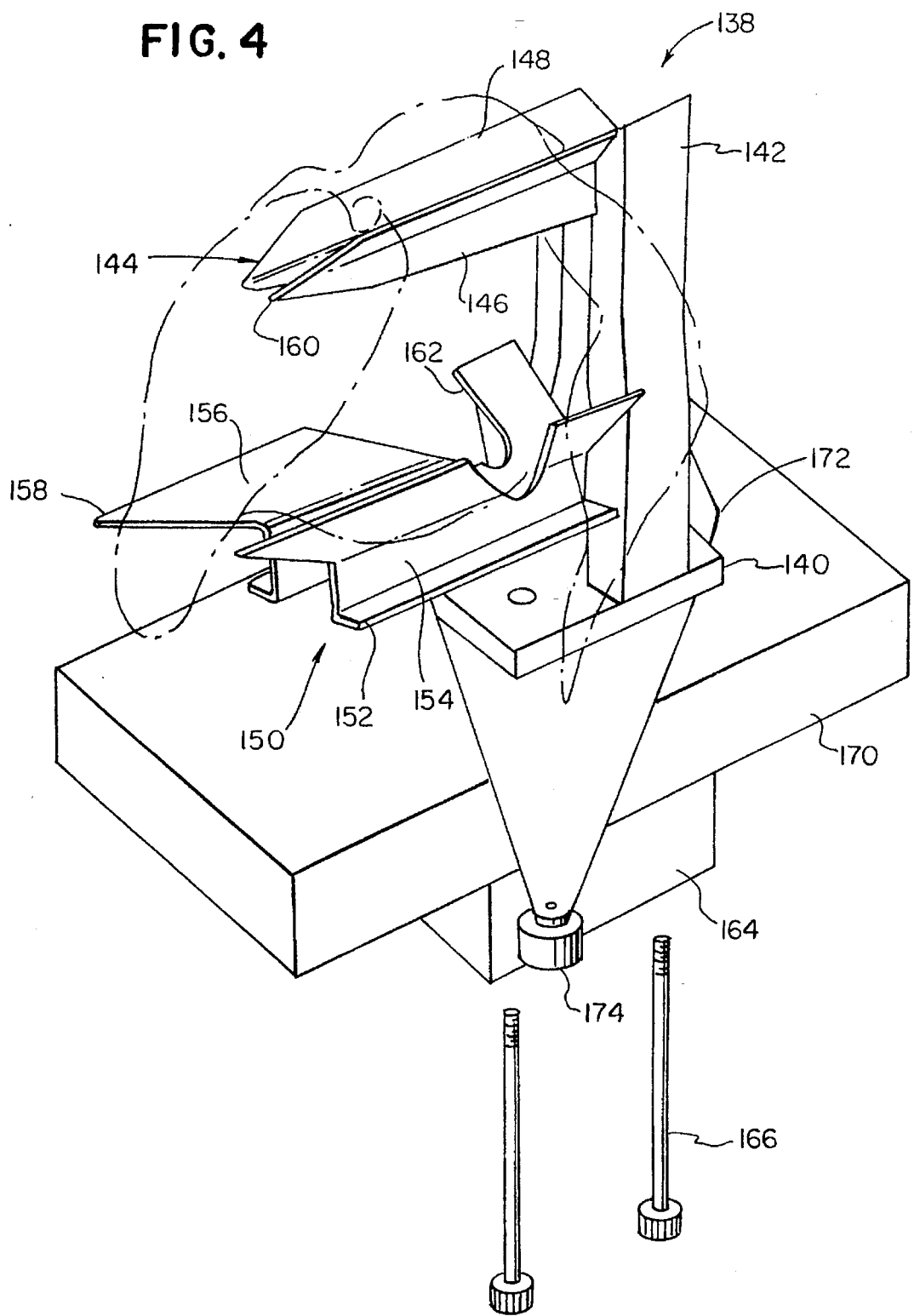
FIG. 4 is a perspective view of a portion of the invention.

FIG. 4 shows a fixture 138 in detail. It includes a base plate 140 to which are welded two spaced vertical bars 142, each of which is inwardly beveled at a 45° angle at the top. The gap (visible in FIG. 3) between the tops of the bars 142, about ⅜ of an inch, provides clearance for a vertical blade described below. A pair of upper arms 144, having a similar spacing, are welded to the upper ends of the bars, and normally face downstream. Each upper arm is bent lengthwise, so that it has an lower portion 146 in a vertical plane, and an upper portion 148 flared outward about 45°, so that the upper surface of the upper portion is continuous with the beveled upper end of the bar to which it is affixed.

The upper bars overlie a pair of lower arms 150, each of which has a vertical center portion 152, a lower flange 154 bent 90° outward from the center portion, and an upper flange 156 which flares outward and upward from the center portion, at about 45° from vertical. Each upper flange has a protruding triangular tip 58 that extends beyond the tip 160 of the corresponding upper arm. A notch 162 in each lower arm provides clearance for a blade described subsequently.

The fixtures are attached to the conveyor so that they can rotate through at least 90° about a vertical axis. As FIG. 4 shows, the base of the fixture is affixed to a UHMW (ultra-high molecular weight) polyethylene retainer block 64 by countersunk screws 66 both of which extend through a large hole 168 (not shown) in a guide block 170, and through bolt holes (not shown) in a follower plate 172 having the shape of a parallelogram. A cylindrical UHMW cam follower 174, 176 is affixed at either apex. The fixture, follower plate, and retainer block, interconnected by the screws, are free to rotate about a vertical axis, with respect to the guide block, which is affixed to the conveyor chain, and is prevented from rotating, at least along most of the upper run of the chain, by fixed guide rails 178 best seen in FIG. 3.

FIG. 2 shows a stationary cam plate 180, which is affixed to the machine frame, on one side of the conveyor, in the path of the button 174 of each fixture. The cam plate has an upwardly open curvilinear groove 82 which receives the button. Interaction between these parts oscillates the fixture, as will be described.

A UHMW block 184 is also affixed to the frame, but on the side opposite the cam plate. The roller is positioned so as to strike the flange 176 of each fixture, which has been rotated out of its normal position by the cam plate. Thus, as each fixture is carried along by the chain, the cam plate 180 rotates the fixture one way, and the block 184 subsequently assists in rotating it back to its normal orientation, as suggested by broken lines in FIG. 5.

Figure 5:
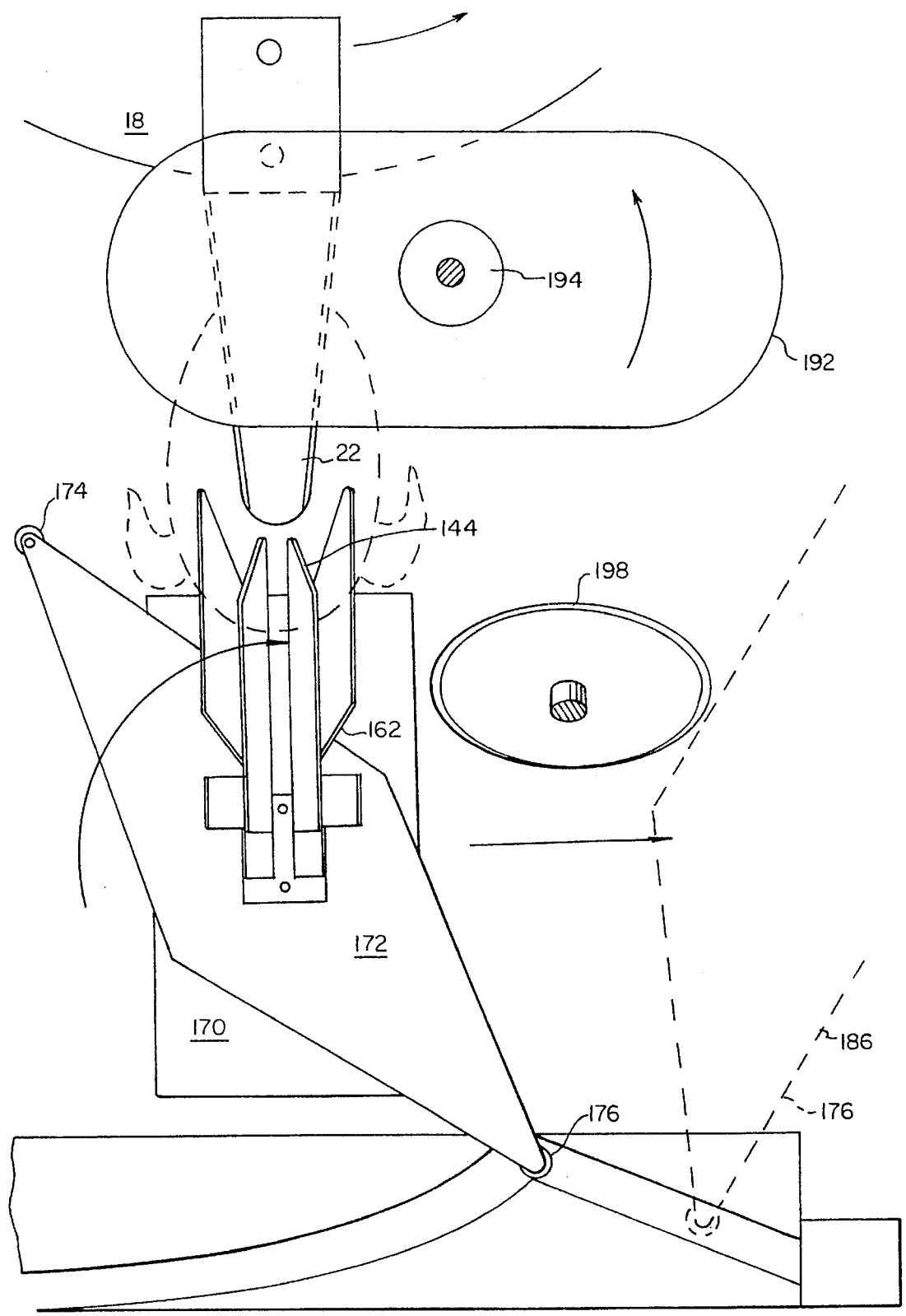
FIG. 5 is a view, at an enlarged scale, of a portion of FIG. 2, showing also an optional cutting blade.

The block 184, together with the cam plate 180 rotates each fixture toward the sprocket 18, in the direction suggested by the curved arrow in FIG. 5, so that its arms 144 face and are aligned with the tines at the point of closest approach. Considering that the conveyor speed is higher (about 50% faster) than the peripheral speed of the tines, it is necessary compensate for the speed differential, to provide a sufficiently long dwell period for the product to be transferred from the tines, onto which they have been placed by a mechanism described below, to the fixture arms. This compensation is accomplished by designing the contour of the cam slots so that the fixture is rotated rearward, as the fixture approaches the tine, at such a speed that the tips of the arms have an absolute speed about equal to that of the tine tips. The exact contour of the cam slot, then, will depend upon factors including the relative speeds of the large sprocket and the conveyor.

To push the upper halves from the tines onto the fixtures, there is a flat paddle 192 supported on a synchronously powered shaft 194 having a vertical axis, just above the large sprocket 18. The rounded ends of the paddle sweep through a space just above the tines. The direction of rotation is such that a paddle tip sweeps each upper half from its tine onto the upper arms of the fixture.

FIG. 4 shows an upper breast half on the fixture, in phantom lines. One may see that the open "V" between the two upper arms supports the backbone, while the open "V" between the two lower arms supports the breast from below. Both of these vees tend to center the rib cage, top and bottom, so that subsequent cutting is more precise.

Certain cutting schemes (e.g., the so-called "9 piece" cut) call for removal of the lower portion of the breast, that is, the portion below the hard part of the sternum, before the breast is halved. To make this cut, an optional rotary blade 198 (FIG. 5) is placed in the path of the breast, just downstream of the fixture, before it is rotated back to its normal orientation by the roller 186. The purpose of the notches 162 is apparent: they provide clearance for the blade as this cut is made.

Figure 6:
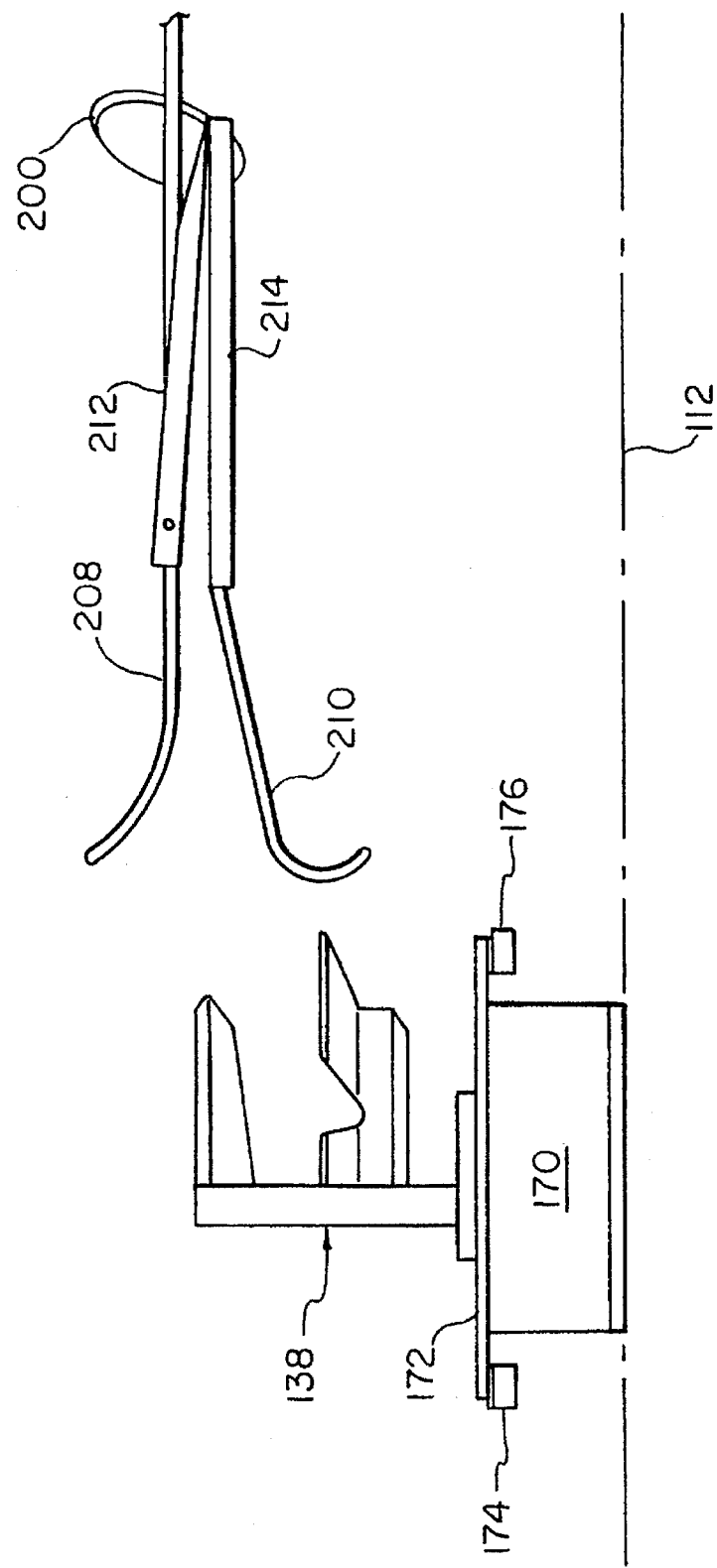
FIG. 6 is a view, at an enlarged scale, of a portion of FIG. 1.

Now we turn to the downstream portion of the apparatus, which includes five rotary blades. See FIG. 2. The first pair of blades are wing cutters 200, supported on motor-driven shafts 202. In the configuration shown in FIG. 2, these blades sever the wing from the breast at the shoulder joint. However, the blades may be swung out of position to make a cut leaving the wing on the breast. To make this possible, each wing cutter is supported on a platform 204 mounted on a vertical shaft 206 about which it can pivot at least 60°, to a position where the blades are completely clear of the product. Upper and lower guide rails 208, 210 (FIG. 6) pass over and under the shoulder, to locate it initially. Each shoulder then passes between a pair of bars 212, 214, the lower of which is spring biased upward, so that the shoulder is precisely positioned before the cutting blade is encountered. The bars 212, 214 also pivot about a vertical axis, and are spring biased outward to tension the shoulder joint as it is cut.

Just beyond the wing cutters, there are a pair of backbone cutting blades 216, whose drive motors are supported on a carriage 218 affixed to the frame by bolts passing through slots which permit one to alter both the height and angle of the blades. Thus, a packer can fine tune the backbone cut, depending on the type of product desired.

Finally, at the end of the apparatus, a large single rotary halving blade 220 is mounted right on the center plane of the apparatus. This blade can be moved up or down about two inches on the frame. In its lowermost position, the edge of the blade extends between the fixture bars, almost to the base of the fixture, and severs the breasts from one another. When raised, however, the blade passes between the upper arms of the fixture, but not the lower ones, and so only cuts the back in half, without separating the breasts. The blade is rotated so that its leading edge moves downward, frictionally driving the carcass down, better seating it in the fixture.

While the machine described above is designed particularly for chickens, the invention should be useful, with minor modifications, for butchering other fowl or other vertebrates. The claims below are intended to cover all such variations.

Since the invention is subject to modifications and variations, it is intended that the foregoing description and the accompanying drawings shall be interpreted as illustrative of only one form of the invention, whose scope is to be measured by the following claims.

I claim:

1. A mechanism for automatically transferring a top portion of an animal carcass, having an open abdominal cavity, whose bottom portion is suspended from a foot shackle conveyor, onto a separate conveyor as the top portion is cut from the lower portion, while leaving the lower portion suspended in the foot shackle conveyor, said mechanism comprising means for preventing the carcass from swinging in the foot shackle conveyor, means carrying a series of tines along a path which approaches the carcass path at the level of the abdominal cavity's opening so that each tine is directed at and then enters the cavity through the opening, a pivot connection between the carrying means and each tine, so that the tine can pivot between a raised position, as it approaches the opening, and a depressed position as it extends into the cavity, and a knife for separating the upper and lower halves after the tine has entered the cavity, said carrying path thereafter leading away from the foot shackle conveyor.

2. The invention of claim 1, further comprising means for moving said tine between said raised and depressed positions.

3. The invention of claim 2, wherein said means comprises a lever connected to the tine, and a stationary cam engaging the lever, said cam being configured so as to lower the tine as it begins to enter the opening, and then raise the tine after it has fully entered the cavity.

4. The invention of claim 1, wherein the knife is a circular blade passing above the tines.

5. The invention of claim 4, further comprising means for pulling the bottom portion away from the upper portion after they have been separated by the knife, in case the portions remain connected by skin.

6. A mechanism for automatically transferring a top portion of an animal carcass, having an open abdominal cavity, whose bottom portion is suspended from a foot shackle conveyor, onto a separate conveyor as the top portion is cut from the lower portion, while leaving the lower portion suspended in the foot shackle conveyor, said mechanism comprising means for preventing the carcass from swinging in the foot shackle conveyor, wherein the swing preventing means comprises an auger disposed beneath the foot shackle conveyor, parallel thereto, and rotating at a speed sufficient to move birds engaged by the auger at the same speed as the shackle conveyor, and a barrier to keep each bird in a particular groove of the auger, means carrying a series of tines along a path which approaches the carcass path at the level of the abdominal cavity's opening so that each tine is directed at and then enters the cavity through the opening, and a knife for separating the upper and lower halves after the tine has entered the cavity, said carrying path thereafter leading away from the foot shackle conveyor.

7. A method of transferring a top portion of an animal carcass, having an open abdominal cavity, whose bottom portion is suspended from a foot shackle conveyor, onto a separate conveyor as the top portion is cut from the lower portion, while leaving the lower portion suspended in the foot shackle conveyor, said method comprising steps of preventing the carcass from swinging in the foot shackle conveyor, carrying a series of tines along a path which approaches the carcass path at the level of the abdominal cavity's opening so that each tine is directed at and then enters the cavity of a carcass through the opening, pivoting the tine from a raised position, as it approaches the opening, to a depressed position, as it extends into the cavity, severing the upper and lower halves after the tine has entered the cavity, and thereafter carrying the tines and the bottom portions supported thereon away from the foot shackle conveyor.

* * * * *